United States Patent [19]

Rodewald

[11] Patent Number: 4,997,632

[45] Date of Patent: Mar. 5, 1991

[54] METHOD OF REMOVING CHLOROFLUOROCARBONS FROM THE ATMOSPHERE

[75] Inventor: Paul G. Rodewald, Rocky Hill, N.J.

[73] Assignee: Mobil Oil Corporation, Fairfax, Va.

[21] Appl. No.: 529,997

[22] Filed: May 29, 1990

[51] Int. Cl.$^5$ ............................. C01B 7/19; B01J 8/00
[52] U.S. Cl. ..................................... 423/240; 423/659; 423/DIG. 70; 422/122; 422/123
[58] Field of Search ................................ 422/122-123, 422/4, 10; 55/71, 74; 423/240, 659

[56] References Cited

PUBLICATIONS

C-Y Hsiao, C-L Lee and D. F. Ollis, "Heterogeneous Photocatalysis: Degradation of Dilute Solutions of Dichloromethane ($CH_2Cl_2$) Chloroform ($CHCl_3$), and Carbon Tetrachloride ($CCl_4$) with Illuminated $TiO_2$ Photocatalyst", Jour. Cat. 82, 418-423 (1983).

Primary Examiner—Robert J. Warden
Assistant Examiner—Howard Hampel
Attorney, Agent, or Firm—Alexander J. McKillop; Charles J. Speciale; Jessica M. Sinnott

[57] ABSTRACT

A method of using photoactive semiconductors to reduce atmosphere chlorofluorocarbons by dispersing photoactive semiconductor particles, namely titanium dioxide, zinc oxide or zinc sulfide into the stratosphere, activating the particles through exposure to ambient light, accumulating chlorofluorocarbons by chemisorption into the semiconductor, precipitating the reacted particles from the stratosphere and hydrolyzing the chlorofluorocarbon moiety into involatile components.

20 Claims, No Drawings

METHOD OF REMOVING CHLOROFLUOROCARBONS FROM THE ATMOSPHERE

FIELD OF THE INVENTION

The invention relates to a method of using photoactive semiconductors to reduce upper atmospheric chlorofluorocarbons. Specifically the invention is directed to dispersing a light activated semiconductor into the stratosphere which will accumulate atmospheric chlorofluorocarbons and, thereafter, descend to the earth's surface whereupon the chlorofluorocarbon moiety will be hydrolyzed into involatile components.

BACKGROUND OF THE INVENTION

Ozone present in the upper atmosphere acts as a natural barrier which protects the environment from excessive solar ultraviolet radiation. It is believed that industrial and private usage of chlorofluorocarbons significantly depletes the concentration of ozone in this protective stratospheric barrier. Chlorofluorocarbons migrate into the stratosphere whereupon they are exposed to ultraviolet light which causes the chlorofluorocarbon molecules to dissociate. The resulting chlorine atoms catalyze a conversion of ozone to oxygen. It is believed that a single chlorine atom can destroy approximately 100,000 ozone molecules and that this ozone loss permits an increase in the amount of ultraviolet light reaching the earth's surface. Excessive ultraviolet irradiation is believed to contribute to serious health and environmental problems. Some health problems linked to ozone depletion include skin cancer, immune deficiencies and cataracts. Environmental problems that may result from diminished ozone are damage to crops and plankton which are critical to the functioning of the marine ecosystem.

The detrimental atmospheric chlorofluorocarbons are produced by halocarbon aerosol propellants, refrigerants and foams. It is believed that the chlorofluorocarbons of particular concern are $CCl_2F_2$ and $CCl_3F$ which have been released in large quantities over time and have the stability to reach the upper atmospheric layers. Although the manufacture of aerosol products containing these chlorofluorocarbons has been banned in the United States and other countries since Dec. 15, 1978, chlorofluorocarbon aerosols are not banned in all countries. Furthermore, chlorofluorocarbons are used as refrigerants in air-conditioning, blowing agents for forming polyurethane foams, dry-cleaning solvents and degreasing agents in the aerospace, electronics and specialty clothing industries (i.e., fur and leather). Additional uses for chlorofluorocarbons have been found in the synthesis of commercially important fluorovinyl monomers.

Photocatalyzed reactions using titanium dioxide to remove halocarbons from waste hydrocarbon liquids or vapors and drinking water have been described in D. F. Ollis, C-Y. Hsiao, C-L. Lee, *Heterogeneous Photocatalysis: Degradation of Dilute Solutions of Dichloromethane ($CH_2Cl_2$), Chloroform ($CHCL_3$) and Carbon Tetrachloride ($CCl_4$) with Illuminated $TiO_2$ Photocatalyst*, J. Catal., Vol. 82, p.p. 418–423 (1983) which is incorporated herein by reference.

SUMMARY OF THE INVENTION

A method of reducing atmospheric halocarbons, specifically chlorofluorocarbons, has now been found. The method comprises dispersing light activated semiconductors into the stratosphere which will be activated by ambient light and then react with the halocarbons. As the atmospheric halocarbons accumulate on the surface of the semiconductors, the molecules will become heavier and fall to the earth's surface to become hydrolyzed into involatile components upon contact with water.

DETAILED DESCRIPTION OF THE INVENTION

It has now been found that light activated semiconductors can be used in a method of reducing the amount of harmful atmospheric chlorofluorocarbons. Although any such semiconductor is contemplated, the typical semiconductors include those compounds containing metals or semimetals i.e., those elements bordering on the division between metals and nonmetals in the Periodic Table of the Elements that exhibit some properties of both metals and nonmetals. More specifically contemplated are compounds containing alkali metals, alkaline earth metals and transition metals, such as alkali metal halides, alkaline earth metal and transition metal oxides and sulfides. The light activated semiconductors which are particularly preferred are those transition metal oxides and sulfides which can be activated by photoenergy in the visible and ultraviolet light ranges, particularly those activated by ultraviolet light present in the upper atmosphere which ranges from 320–400 nm in wavelength. Because of the abundance of ultraviolet light of the appropriate wavelength in the stratosphere, the semiconductor compounds which are less easily photoactivated, relative to other semiconductors, are most preferred. Semiconductors of this kind can be described in terms of their band gap values. Because the theory behind band gap values goes beyond the scope of the invention, a detailed description of band gap values will not be discussed here. However, a more detailed summary can be found in Kirk-Othmer, *Encyclopedia of Chemical Technology*, Vol. 20, John Wiley & Sons 1982, p.p. 601–606 which is incorporated herein by reference. The values are used here merely as a means for providing an approximate parameter which may help to further define the semiconductors which it is believed are most suited to the present invention. Thus, to qualify the properties of the contemplated semiconductors, the semiconductor compounds include those which have band gap values (Eg), represented in terms of eV at room temperature, greater than 0.18, preferrably 1.0, but no more than 5.0, preferably 4.0. In terms of the relationship between conductors and insulators, the semiconductors have band gap values falling between metals and insulators. Metals, for example, are conductors and have band gap values of approximately zero. Insulators, on the other hand, have band gap values, typically, greater than 5.0. Comparatively, the semiconductors contemplated include titanium dioxide which has a band gap value about 3.0 and zinc oxide which has a band gap value of about 3.2. For band gap values of other compounds see *Handbook of Chemistry and Physics*, Robert E. West, Ed, CRC Press, Inc. FL (1980) p.p. E-102–E-106 which is incorporated herein by reference. Nonlimiting examples of suitable semiconductors, along with titanium dioxide and zinc oxide, include zinc sulfide, nickel oxide, iron oxide ($Fe_3O_4$) and cuprous oxide ($Cu_2O$).

An important physical property that the semiconductors of the invention have is an ability to be produced in very fine particle sizes which facilitates suspension in the stratosphere. For example, keeping the semiconductors suspended long enough to be photoactivated and thereby react with the halocarbons and long enough to chemisorb a suitable number of halocarbons is an important aspect of the invention. It has been found that finely divided semiconductor particles can be suspended in the atmosphere for extended periods of time. The actual suspension time can be varied from 8 hours to one year, preferably 1 to 100 days depending upon the size of the particles. As those skilled in the art will appreciate, a large particle can be suspended for a shorter period of time; yet, having a large surface area, the particle can accumulate more halocarbons than a smaller particle. Alternatively, a smaller particle can be suspended longer; however, having a smaller surface area, the smaller particle cannot accumulate as many halogens as the larger particle. However, for a given weight of the particles, the aggregate surface area of smaller particles can be greater than the aggregate area of the same weight of larger particles. Accordingly, a given weight of smaller particles can accumulate a greater number of halocarbons than the same weight of larger particles. Furthermore, atmospheric conditions at high altitudes may effect the preferred particle size. The main ozone layer exists at elevations ranging from 20 to 40 km above sea level where temperatures range from 13° C. to 60° C. and atmospheric pressures range from 42 to 9.5 mm Hg. Under these conditions, the optimum semiconductor particle size can range from 0.3000 nm to 500,000 nm, preferably from 10 to 100,000 nm. Although an effective result can be achieved when the particles are very small, to prevent the particles from creating a contamination problem of their own, the particles must be heavy enough to gradually return to the earth's surface on their own even though reaction with the halocarbons can increase their rate of return.

A principal purpose of the invention is to interrupt the reaction chain that leads to destruction of ozone by removing chlorofluorocarbons from the reaction pathway. Since approximately 10 to 1,000 halocarbons can accumulate onto the surface of a single semiconductor, depending upon the size of the particle, a significant number of halocarbons can be removed through this process. The ozone level can then be restored through ozone producing reactions which occur naturally.

It is contemplated that the invention can be targeted to restore areas of significant ozone depletion by dispersing the particles directly into locations where the ozone level is particularly low. For example, the number of semiconductors dispersed per m$^3$ of atmosphere can range from about 10 to 10,000 depending upon the severity of halocarbon contamination in a given location. Alternatively, a less localized, and more diverse, dispersion program can be undertaken. Further, a partial halocarbon decontamination program is also contemplated in which relatively small amounts of halocarbons are periodically removed as they diffuse up into the stratosphere over time intervals ranging from 6 months to 10 years. This results in a gradual, yet effective, increase in the ozone level leading to a reduction in the amount of hazardous ultraviolet radiation reaching the earth's surface.

Any suitable vehicle for dispersing the semiconductors into the stratosphere is appropriate. Specifically contemplated vehicles include airplane, balloon or rocket in which the particles are blown, sprayed, exploded, scattered or otherwise ejected from the dispersing vehicle.

As an example of the process of the present invention, very finely divided titanium dioxide particles of about 35 nm in size are employed as the semiconductor. The titanium dioxide is dispersed into the upper atmosphere where it is activated by ultraviolet light of wavelengths greater than or equal to 350 nm. Although the exact mechanism for the reaction is unclear, one proposed mechanism suggests that the ultraviolet light interacts with the titanium dioxide to produce a positive hole associated with the titanium atom. This activated titanium dioxide then reacts with chlorofluorocarbons to produce Ti-Cl and Ti-O-C bonds. Another proposed mechanism involves dissociative adsorption of the halocarbon on the titanium dioxide surface. In any event upon accumulating approximately 10 to 1,000 chlorofluorocarbons the titanium dioxide particle descends to the earth's surface carrying with it the harmful halocarbons.

The Ti-Cl and Ti-O-C bonds are readily hydrolyzed by water to produce hydrated titanium dioxide, hydrochloric acid and oxygenated chlorofluorocarbons, i.e. HOCF$_2$Cl, which rapidly decompose and hydrolyze to produce CO$_2$, HCl, and HF. The acids produced by hydrolysis are water soluble and dissolve in and are neutralized by ocean water. A proposed mechanism representative of the above reaction is as follows:

$$
\begin{array}{rl}
(1) & \text{TiO}_2 \\
& \downarrow \text{uv light} \\
(2) & \equiv\text{Ti}\overset{+}{-}\text{O}-\text{Ti}\equiv \; + \; e^- \; + \; \text{Cl}-\text{CF}_2\text{Cl} \\
& \downarrow \\
& \equiv\text{Ti} \; + \; \text{O}-\text{Ti}\equiv \\
& \quad | \qquad \quad | \\
& \quad \text{Cl} \qquad \text{CF}_2\text{Cl} \\
(3) & \downarrow \text{H}_2\text{O} \quad (4) \downarrow \text{H}_2\text{O} \\
\text{HCl} + & \equiv\text{Ti} \; + \; \text{Ti}\equiv \; + \; \text{HOCF}_2\text{Cl} \\
& \quad | \qquad \quad | \\
& \quad \text{OH} \qquad \text{OH} \\
(5) & \searrow \; -\text{H}_2\text{O} \qquad (6) \downarrow -\text{HCl} \\
& \text{TiO}_2 \\
& \qquad\qquad\qquad\quad \underset{\text{F C F}}{\overset{\overset{\text{O}}{\|}}{}} \\
& \qquad\qquad\qquad (7) \downarrow \text{H}_2\text{O} \\
& \qquad\qquad\qquad \text{CO}_2 + 2\text{HF}
\end{array}
$$

Titanium dioxide, best known as a white pigment and an opacifying agent, has been previously described as a semiconductor in the electronics industry and as a catalyst. It has a high refractive index, lacks absorption of visible light, and can be reproduced in different size ranges, it is also stable and nontoxic. Titanium dioxide comes in three different forms; anatase, brookite and rutile, any three of which can be used in the invention. Rutile being the most stable form is preferred. A general description of titanium dioxide can be found in Kirk-Othmer *Complete Chemical Encyclopedia* Vol. 23 p.p.

139-145 John Wiley & Sons, publishers (1983) which is incorporated herein by reference. Titanium dioxide is most suitable in the present invention because it is activated by ultraviolet light ranging in wavelengths from about 330 nm to 350 nm.

One method of obtaining finely divided semiconductors is by fuming which results in particles ranging in size from approximately 20 nm to 50nm, usually about 35 nm. For example, fumed titanium dioxide is obtained by high temperature hydrolysis of titanium tetrachloride. A proposed mechanism for the reaction is as follows:

$$TiCl_4 + 2H_2O \xrightarrow{\sim 1100^\circ C.} TiO_2 + 4HCl$$

The temperature of the reaction can range from at least 700° C. to 900° C., at most 1200° C. to 1400° C. An excess of water can be used; however the reactants should be contacted in a molar ratio expressed as moles of titanium tetrachloride to water of 1:10, preferrably 1:2. The reaction is a rapid high temperature process which generally takes place in a hydrogen-oxygen furnace.

As previously mentioned, zinc oxide is also a suitable material. The properties of zinc oxide are similar to titanium dioxide. Zinc oxide is nontoxic, it absorbs ultraviolet light below 366 nm, and is known to react with chlorine. It has been described as a white pigment, a semiconductor and a catalyst. Furthermore zinc oxide can be produced in fine particle sizes ranging from 10 nm to 100,000 nm. A general description of zinc oxide can be found in Kirk Othmer *Complete Chemical Encyclopedia*, Vol. 24 p. p. 845-847 which is incorporated herein by reference.

Other semiconductors such as nickel oxide, zinc sulfide, iron oxide and cuprous oxide will also be advantageous in the present invention since they can be photoactivated and reacted with a halide such as chlorine and then hydrolyzed on contact with water into involatile components which are hydrolized transition metal oxides and sulfides such as zinc oxide, zinc sulfide, nickel oxide, iron oxide and cuprous oxide as well as oxygenated chlorofluorocarbons which decompose to $CO_2$, HCl and HF.

What is claimed is:

1. A method of using photoactive semiconductors to reduce atmospheric halocarbons comprising
   i. dispersing photoactive semiconductors into the stratosphere;
   ii. activating the photoactive semiconductors with ultraviolet radiation for chemisorption of halocarbons;
   iii. suspending the activated semiconductors;
   iv. chemisorbing the halocarbons onto the semiconductors;
   v. precipitating, from the stratosphere, the halocarbons chemisorbed onto the semiconductors; and
   vi. hydrolyzing the halocarbon chemisorbed onto the semiconductor.

2. The method of claim 1 in which the semiconductors are finely divided into sizes ranging from 10 nm to 100,000 nm.

3. The method of claim 1 in which the semiconductors are suspended for 8 hours to 1 year.

4. The method of claim 1 in which the semiconductors are precipitated from the stratosphere upon accumulating five to five thousand halocarbons.

5. The method of claim 1 in which the semiconductor is an inorganic photoactive semiconductor containing a metal or semimetal.

6. The method of claim 1 in which the semiconductors are activated by ultraviolet light ranging in wavelengths from 320 to 400 nm.

7. The method of claim 5 in which the inorganic semiconductor is titanium dioxide, zinc oxide, zinc sulfide, nickel oxide, iron oxide and cuprous oxide.

8. A method of using photoactive semiconductors to reduce atmospheric halocarbons comprising:
   i. dispersing a photoactive transition metal oxide or sulfide into the stratosphere;
   ii. activating the transition metal oxide or sulfide with visible or ultraviolet radiation for chemisorption of the halocarbons;
   iii. suspending the activated transition metal oxide or sulfide;
   iv. chemisorbing the halocarbons onto the transition metal oxide or sulfide;
   v. precipitating, from the stratosphere, the halocarbons chemisorbed onto the transition metal oxide or sulfide; and
   vi hydrolyzing the halocarbon chemisorbed onto the transition metal oxide or sulfide.

9. The method of claim 8 in which the transition metal oxide or sulfide is titanium dioxide, zinc oxide, zinc sulfide, nickel oxide, iron oxide or cuprous oxide.

10. The method of claim 8 in which the transition metal oxides or sulfides are activated by light ranging from 320 to 400 nm.

11. The method of claim 8 in which the transition metal oxides or sulfides range from 10 nm to 100,000 nm.

12. The method of claim 8 in which the transition metal oxides or sulfides are suspended for 8 hours to 1 year.

13. The method of claim 8 in which the transition metal oxides or sulfides are precipitated from the stratosphere upon accumulating 5 to 5,000 halocarbons.

14. The method of claim 8 in which the transition metal oxides or sulfides are hydrolyzed into transition metal oxides or sulfides and oxygenated chlorofluorocarbons.

15. A method of using photoactive titanium dioxide as a semiconductor to reduce atmospheric halocarbons comprising:
   i. dispersing particles of titanium dioxide into the stratosphere;
   ii. activating the titanium dioxide particles through exposure to ultraviolet radiation for chemisorption of the halocarbons;
   iii. suspending the activated titanium dioxide particles;
   iv. precipitating, from the stratosphere, the titanium dioxide particles which have reached a substantial density by chemisorbing the halocarbons; and
   v. hydrolyzing the halocarbon chemisorbed onto the titanium dioxide particle into involatile components.

16. The method of claim 15 in which the titanium dioxide particles range from 10 nm to 100,000 nm.

17. The method of claim 15 in which the titanium dioxide particles are activated by ultraviolet light radiation ranging from 320 to 400 nm.

18. The method of claim 15 in which the titanium dioxide particles are suspended for 8 hours to 1 year.

19. The method of claim 15 in which the titanium dioxide particles are precipitated from the stratosphere upon accumulating 5 to 5,000 halocarbons.

20. The method of claim 15 in which the titanium dioxide is hydrolyzed into titanium dioxide and oxygenated chlorofluorocarbons.

* * * * *